United States Patent
Slupik et al.

(10) Patent No.: US 10,143,067 B1
(45) Date of Patent: Nov. 27, 2018

(54) NETWORKED LIGHTING SYSTEM AND METHOD

(71) Applicant: Silvair Sp. z o.o., Kraków (PL)

(72) Inventors: Szymon Slupik, Kraków (PL); Maciej Witalinski, Jaworzno (PL)

(73) Assignee: Silvair Sp. z o.o., Kraków (PL)

( * ) Notice: Subject to any disclaimer, the term of this patent is extended or adjusted under 35 U.S.C. 154(b) by 0 days.

(21) Appl. No.: 15/884,315

(22) Filed: Jan. 30, 2018

(51) Int. Cl.
*H05B 37/02* (2006.01)
*H05B 33/08* (2006.01)

(52) U.S. Cl.
CPC ..... *H05B 37/0227* (2013.01); *H05B 37/0272* (2013.01); *H05B 33/0854* (2013.01)

(58) Field of Classification Search
CPC .. H05B 37/0272; H05B 33/0854; H02J 50/40
USPC ........................................ 315/152, 312, 324
See application file for complete search history.

(56) References Cited

U.S. PATENT DOCUMENTS

| | | | | |
|---|---|---|---|---|
| 9,220,156 B2* | 12/2015 | Bishop | .................. | G08C 17/02 |
| 2003/0102979 A1* | 6/2003 | Jednacz | .................. | H04L 45/00 |
| | | | | 340/9.1 |
| 2012/0236554 A1* | 9/2012 | Rust | .................. | H05B 33/0857 |
| | | | | 362/231 |
| 2016/0007429 A1* | 1/2016 | Eskonen | ............ | H05B 37/0227 |
| | | | | 315/297 |

* cited by examiner

*Primary Examiner* — Thuy Vinh Tran
(74) *Attorney, Agent, or Firm* — McGeary Cukor LLC; Kenneth Ottesen; Jason Paul DeMont

(57) ABSTRACT

A system of luminaires, which are connected to one another within a mesh network, and which interoperate in accordance with the disclosed method. Each luminaire in the mesh network is capable of originating a notification message whenever one of a predefined set of state changes is detected by the luminaire's controller. Also, a given type of state change might correlate to more than one type of event having occurred. For example, a particular type of state change can be attributed to any of i) a sensing of occupancy in the vicinity of the luminaire, ii) manual actuation of a light switch, iii) a timer going off, and iv) an external command being received. The luminaire's controller is also capable of receiving and processing notification messages originated by other luminaires, and of relaying, to other luminaires in the mesh network, information from received notification messages.

20 Claims, 7 Drawing Sheets

NETWORKED LIGHTING SYSTEM AND METHOD

FIELD OF THE INVENTION

The present invention relates to building automation and control in general, and, more particularly, to a data-networked lighting system and method.

BACKGROUND OF THE INVENTION

"Commercial building automation," or "commercial automation," refers to the use of computer and information technology to control commercial building systems, such as lighting, HVAC, audio-visual, smoke detection, security, and shading, among others. Using specialized hardware and control logic, building devices can monitor their environment and can be controlled automatically. Although commercial automation has been available at some level of sophistication for some time, it steadily becomes more practical, both from a technological and cost perspective.

Lighting automation, in particular, has evolved over time. Lighting systems now exist in which luminaires that comprise sensors, lamps, and control logic are networked together, in what is sometimes referred to as "connected lighting" or networked "smart lighting." In such a network, the sensors that are associated with the luminaires collect data about the local environment, such as data related to occupancy and data related to ambient lighting in the vicinity of the luminaires. The networked luminaires communicate with each other, in some cases sharing the sensor data, and adjust the light output of the lamps via the control logic, with some level of coordination across the networked luminaires.

Commercially-available, connected-lighting control strategies already exist that rely on, for example, i) scheduling, ii) occupancy-based control, which includes the switching off of all lights when an office space is vacant, and iii) lumen maintenance with tuning. These approaches are intended to help conserve energy in office buildings.

In addition to energy conservation, there are other issues to consider in planning and implementing a lighting control strategy. While switching on lights only in occupied areas within a building would be best for conserving energy, it is also important to consider a building occupant's comfort and productivity. To this end, specific considerations might include i) providing the proper quantity and quality of light at the proper time to a given space based on personal preference, time of day, and even the type of tasks to complete, and ii) providing comfortable lighting conditions in the immediate vicinity of occupants that are moving and appropriate lighting levels (e.g., reduced levels, etc.) in the leading and trailing areas along the occupant's path.

SUMMARY OF THE INVENTION

The present invention enables a system of luminaires, which are connected to one another within a mesh network, to interoperate with one another without at least some of the disadvantages in the prior art.

In at least some connected lighting systems in the prior art, the connected lighting units share occupancy data with one another, wherein the occupancy data is representative of occupancies in the respective sensor-monitored areas (e.g., within a building, etc.) that are associated with the lighting units. The sensor-monitored areas are monitored by respective sensors that are part of the lighting units.

In contrast, the illustrative embodiment of the present invention features a luminaire, in mesh network of luminaires, that originates a notification message whenever one of a predefined set of state changes is detected by the luminaire's controller. Each possible type of state change detected at the luminaire correlates to a particular event or events having occurred. Also, a given type of state change might correlate to more than one type of event having occurred. For example, a state change in the illustrative embodiment from a Bluetooth® mesh network state of "Standby" to "Fade On" can be attributed to any of the following events: i) a sensing of occupancy in the vicinity of the luminaire, ii) manual actuation of a light switch, iii) a timer going off, and iv) an external command being received. The inventors had the insight, however, that the desired control response—in particular, the effect on other luminaires in the network—can be treated as being independent of the particular event that caused the state change, at least for some of the types of state changes, and can be treated instead as being dependent on the state change itself.

Therefore, the inventors also realized that it is sufficient to originate a notification message in response to predefined set of state changes, instead of transmitting the data that is representative of the event that caused the state change. Consequently, no occupancy data is shared amongst the luminaires or included in the notification message, at least for the purpose of controlling the luminaires. As a result, each notification message is advantageously shorter than it would otherwise need to be, thereby making communications amongst the luminaires more efficient. This also offers the advantage of freeing up transmission bandwidth within the data network for the purpose of transmitting other types of data.

Concurrent with monitoring for internal state changes, the luminaire's controller is also capable of receiving and processing notification messages originated by other luminaires, and of relaying, to the other luminaires in the mesh network, information from received notification messages. In processing a received notification message, the luminaire of the illustrative embodiment does not require occupancy data to be provided. The luminaire is capable of controlling the light output of its lamp based on the values of various fields in one or more notification messages originated by one or more luminaires, and without relying on occupancy data to be shared.

An illustrative system comprising a data network of luminaires includes a first luminaire that comprises: a receiver configured to receive wirelessly a first message from a second luminaire, wherein the first message comprises a plurality of fields that represent a source address, a propagation range, a hop count, and a light level; a controller configured to modify a first light output of the first lamp, wherein the first light output is based on i) the light level, ii) the hop count, and iii) the range that are received in the first message, and wherein whether the controller modifies the first light output is based on whether the source address in the first message matches an address in a non-empty set of neighbor addresses; a transmitter configured to transmit wirelessly a second message, wherein whether the transmitter of the first luminaire transmits the second message is based on i) the hop count and ii) the range that are received in the first message; and a first lamp configured to provide light at the first light output as modified by the controller.

An illustrative method for controlling a plurality of luminaires in a data network that comprises a first luminaire and a second luminaire, comprises: receiving wirelessly, by the first luminaire, a first message from the second luminaire, wherein the first message comprises a plurality of fields that represent a source address, a propagation range, a hop count, and a light level; modifying, by the first luminaire, a first light output of a first lamp, wherein the first light output is based on i) the light level, ii) the hop count, and iii) the range that are received in the first message, and whether the modifying of the first light output occurs is based on whether the source address in the first message matches an address in a non-empty set of neighbor addresses; transmitting wirelessly, by the first luminaire, a second message, wherein whether the first luminaire transmits the second message is based on i) the hop count and ii) the range that are received in the first message; and providing light, by the first lamp, at the first light output.

DETAILED DESCRIPTION

Based on—For the purposes of this specification, the phrase "based on" is defined as "being dependent on" in contrast to "being independent of". The value of Y is dependent on the value of X when the value of Y is different for two or more values of X. The value of Y is independent of the value of X when the value of Y is the same for all values of X. Being "based on" includes both functions and relations.

Control—For the purposes of this specification, the infinitive "to control" and its inflected forms (e.g., "controlling", "controlled", etc.) should be given the ordinary and customary meaning that the terms would have to a person of ordinary skill in the art at the time of the invention.

Lamp—For the purposes of this specification, the term "lamp" is defined as a device for providing illumination, comprising an electric bulb and its holder.

Luminaire—For the purposes of this specification, the term "luminaire" is defined as a lighting unit comprising a lamp and a controller for controlling the lamp.

Network address—For the purposes of this specification, the term "network address," or "computer network address," is defined as a numerical label assigned to each device (e.g., sensor node, actor node, configuring node, etc.) participating in a computer network. For example, an Internet Protocol address (IP address) is a numerical label assigned to each device participating in a computer network that uses the Internet Protocol for communication. A "source address" is an example of a network address, in that it specifies the device that originated a transmitted data packet or message conveyed by one or more packets.

Controller—For the purposes of this specification, the term "controller" is defined as hardware or hardware and software that perform mathematical and/or logical operations and that control other devices based, at least in part, on the operations performed.

Receive—For the purposes of this specification, the infinitive "to receive" and its inflected forms (e.g., "receiving", "received", etc.) should be given the ordinary and customary meaning that the terms would have to a person of ordinary skill in the art at the time of the invention.

Transmit—For the purposes of this specification, the infinitive "to transmit" and its inflected forms (e.g., "transmitting", "transmitted", etc.) should be given the ordinary and customary meaning that the terms would have to a person of ordinary skill in the art at the time of the invention.

Figure 1:
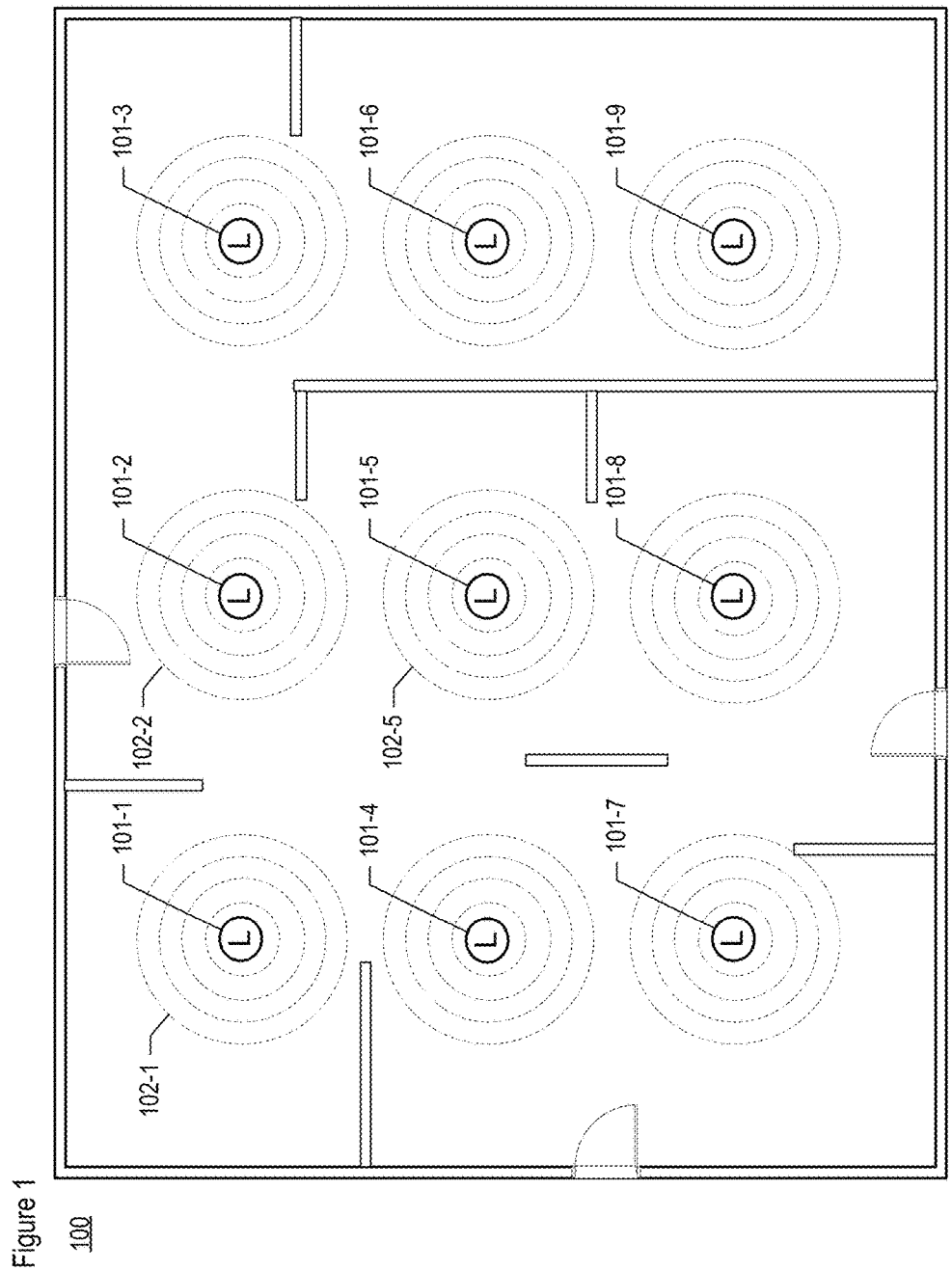
FIG. 1 depicts an illustrative floor plan of building 100, comprising a plurality of luminaire nodes in accordance with the illustrative embodiment of the present invention.

FIG. 1 depicts an illustrative floor plan of building 100, comprising a plurality of luminaire nodes in accordance with the illustrative embodiment of the present invention. Building 100 is equipped with luminaires 101-1 through 101-M, wherein M is a positive integer. As depicted in FIG. 1, M has a value that is equal to nine; in some alternative embodiments of the present invention, M has a value that is a different positive integer. The luminaires communicate wirelessly with one another via transmitted signals 102-1, 102-2, and so forth. In some alternative embodiments of the present invention, however, one or more of the depicted elements can communicate via wired connections.

In accordance with the illustrative embodiment, luminaires 101-1 through 101-M constitute an automation and control system—more specifically, a networked lighting system—in a commercial building, such as an office space or a retail space. As those who are skilled in the art will appreciate after reading this specification, however, the luminaires can also be applied to a different type of building, such as a home, or to include the environment surrounding the building, or to any environment in which automated control can be applied.

Furthermore, building 100 can be a different type of structure with a roof and walls, or can instead be a defined area that comprises multiple sub-areas (e.g., open space, one or more conference rooms, one or more corridors, one or more closed offices, etc.). At least a portion of the area and/or sub-areas can be defined by something other than a roof and/or walls.

As depicted, luminaires 101-1 through 101-M are positioned uniformly and in a grid-like pattern. However, as those who are skilled in the art will appreciate after reading this specification, the luminaires can be positioned in any geometry or geometries with respect to one another, provided that each luminaire is within communication range of one or more of the other luminaires.

In accordance with the illustrative embodiment, nodes 101-1 through 101-M are luminaires comprising lamps that provide light to, and serve as light sources for, their environment within building 100. As those who are skilled in the art will appreciate after reading this specification, however, the nodes can be devices that are other than luminaires (e.g., sound systems, sprinklers, etc.) and that provide a different type of output than light (e.g., sound, water, etc.).

Luminaire 101-*m*, wherein m has a value between 1 and M, inclusive, is an apparatus that comprises memory, processing components, and communication components.

Luminaire 101-*m* is configured to transmit signals 102-*m* that convey control-related information, such as packet-based messages. Luminaire 101-*m* is also configured to provide light at an output that is based, at least in part, on the content of one or more messages received from one or more other luminaires. In some embodiments of the present invention, luminaire 101-*m* can also be configured to sense one or more physical conditions and can transmit messages based on the one or more physical conditions sensed. Luminaire 101-*m* is described in detail below and in FIG. 2.

In accordance with the illustrative embodiment, the luminaires depicted in FIG. 1 distribute data (e.g., the packet-based messages, etc.) according to a mesh network. A "mesh network" is a network topology in which each node relays data for the network. The nodes that are involved cooperate in the distribution of data in the network. A mesh network can relay messages using either a flooding technique or a routing technique.

In accordance with the illustrative embodiment, the luminaires communicate in accordance with Bluetooth® mesh networking, which is used to distribute the data amongst the luminaires. In some alternative embodiments of the present invention, the data distribution is performed via a different protocol, as described below for radio communications module 205 of FIG. 2.

Figure 2:
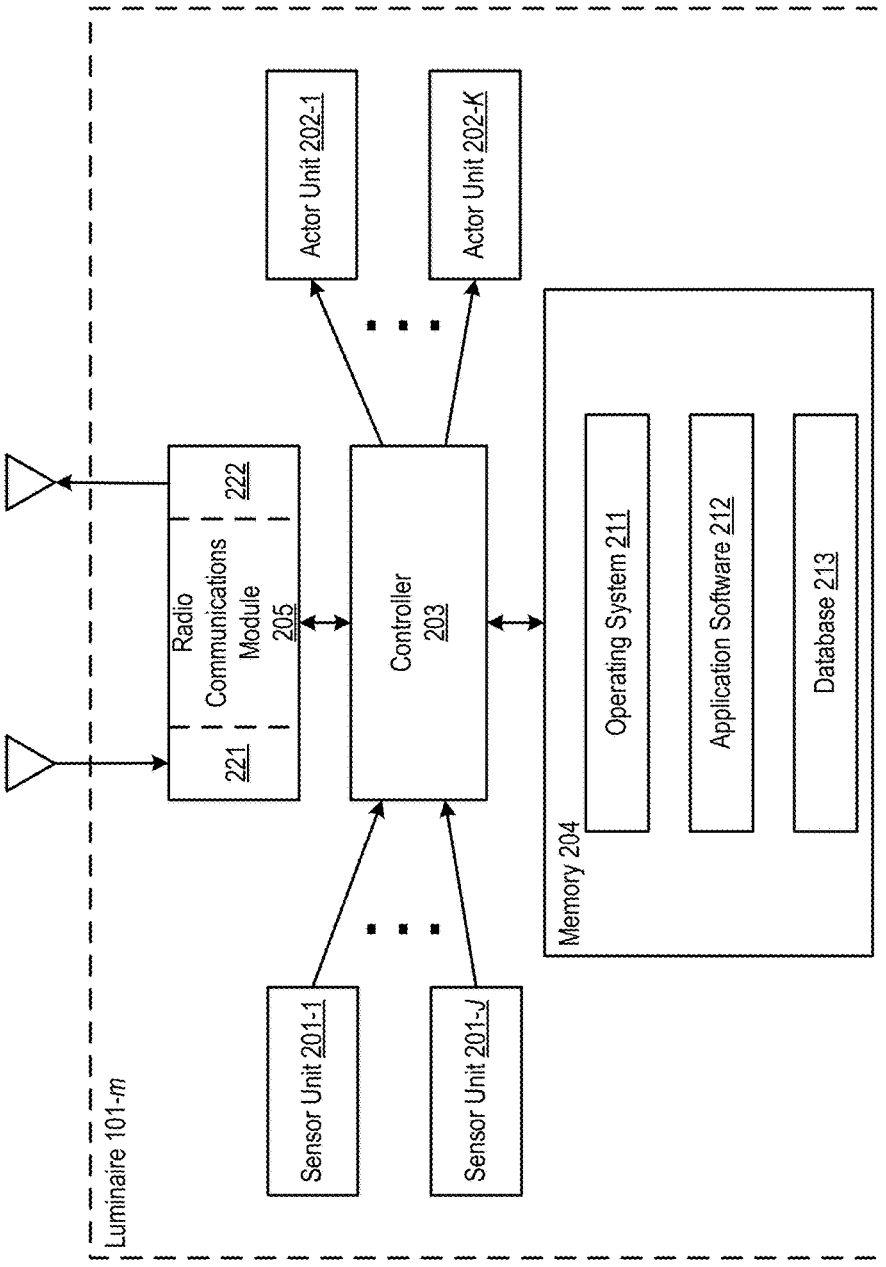
FIG. 2 depicts the salient components of luminaire 101-*m* according to the illustrative embodiment.

FIG. 2 depicts the salient components of luminaire 101-*m* according to the illustrative embodiment. Luminaire 101-*m* is based on a data-processing apparatus whose hardware platform comprises: sensor unit 201-1 through 201-J, wherein J is a positive integer, actor unit 202-1 through 202-K, wherein K is a positive integer, controller 203, memory 204, and radio communications module 205, interconnected as shown.

Sensor unit 201-*j*, wherein j has a value between 1 and J, inclusive, is an apparatus that comprises memory, processing components, and communication components, and is configured to gather information about the environment that is accessible by the sensor unit. Each sensor is configured to monitor a particular physical condition in well-known fashion (e.g., temperature, ambient light, humidity, occupancy, etc.).

Each sensor unit is configured to report a state of the condition by providing input signals to controller 203, wherein the values of the input signals are representative of the states being reported. A given sensor unit 201-*j* can report discrete input signal values and/or a continuum of states and can report states at particular times and/or continuously. A change in state, which is determined by controller 203 as described below, can occur based one or more sensor units detecting changes in the following, in any combination:
  i. environmental probes (e.g., temperature, ambient light, motion, infrared signature, humidity, etc.).
  ii. electrical inputs (i.e., binary, analog, bus), including from a switch.
  iii. signals received via radio (e.g., proximity beacons, etc.).
  iv. a state of the internal logic, woken up periodically based on time or on an external event.

For example and without limitation, a state change can correspond to a switch being actuated, occupancy being detected, a timer or counter reaching a predefined value, and so on.

Actor unit 202-*k*, wherein k has a value between 1 and K, inclusive, is an apparatus that comprises memory, processing components, and communication components, and is capable of doing something in the course of being affected by signals originating externally to the actor component, such as from controller 203, as described in detail below. Each actor unit acts upon its environment in well-known fashion.

Actor unit 202-*k* is configured to receive, transmit, process, and/or relay signals conveying data, as well as being configured to affect a condition, physical or otherwise, in its environment, for example by generating a control signal. In accordance with the illustrative embodiment, actor unit 202-1 of luminaire 101-*m* is a lamp whose output is modifiable by controller logic executed by controller 203.

As those who are skilled in the art will appreciate after reading this disclosure, actor unit 202-*k* can provide a different function than controlling a lamp to give light according to a configurable light output. For example and without limitation, the condition being affected can be:
  i. lighting, which can be adjusted (e.g., turning on or off, changing light output, changing brightness, changing color or mood, changing illuminance, displaying a picture or pattern, etc.).
  ii. sound, which can be adjusted (e.g., increasing or decreasing volume, changing playlist or mood, turning on/off, selecting signal source, etc.).
  iii. room climate, which can be controlled (e.g., increasing or decreasing temperature, humidity, air fragrance, fan speed, etc.).
  iv. an alert, which can be generated (e.g., of an email, of an SMS message, etc.).
  v. monitoring by a camera, which can be panned or tilted.
  vi. office meeting/presentation settings (e.g., selecting one or more of signal source, streaming application, multimedia to play, audio language, subtitles, chapter, play/pause/stop, rewind/fast forward, etc.).
  vii. connected/smart video monitor features (e.g., selecting application to be launched, navigating through on-screen menus, etc.).
  viii. virtual keyboard—navigation on virtual keyboard displayed by other device (e.g., video monitor, set-top box, etc.).
  ix. control of shades/window coverings/blinds.
  x. access control (e.g., unlocking/locking doors, opening/shutting doors, authorizing access to selected rooms or zones, etc.).

Furthermore, node 101-*m* can comprise any combination of and any number of actor functions. As those who are skilled in the art will appreciate, after reading this disclosure, node 101-*m* comprising one or more actor functions can be in a variety of forms, such as a luminaire in a lighting system, a media player as part of an audio/video system, a heater and/or ceiling fan as part of an environment control system, an outgoing-email server as part of a messaging system, an actor in a water sprinkler system, a pump, a robot or robotic arm, a pan/tilt camera, a switch, a motor, a servo mechanism, and so on.

Controller 203 is a processing device, such as a microcontroller or microprocessor with a controller interface, which are well known in the art. Controller 203 is configured such that, when operating in conjunction with the other components of luminaire 101-*m*, controller 203 executes software, processes data, and telecommunicates according to the operations described herein. In particular, controller 203 determines which data values, of which data elements, are to be included in one or more notification messages that are to be transmitted, including a source address of corresponding luminaire 101-*m*, as described below.

Memory 204 is non-transitory and non-volatile computer storage memory technology that is well known in the art (e.g., flash memory, etc.). Memory 204 is configured to store operating system 211, application software 212, and database 213. The operating system is a collection of software that manages, in well-known fashion, luminaire 101-$m$'s hardware resources and provides common services for computer programs, such as those that constitute the application software. The application software that is executed by controller 203 according to the illustrative embodiment enables luminaire 101-$m$ to perform the functions disclosed herein. Database 213 comprises stored information that is based on range state 402, decay exponent state 403, table of neighbors 405, and level-to-lux state 406, as described below.

It will be clear to those having ordinary skill in the art how to make and use alternative embodiments that comprise more than one memory 204; or comprise subdivided segments of memory 204; or comprise a plurality of memory technologies that collectively store the operating system, application software, and database.

Radio communications module 205 is configured to enable luminaire 101-$m$ to telecommunicate with other devices and systems, including other luminaires, by receiving signals therefrom and/or transmitting signals thereto via receiver 221 and transmitter 222, respectively. Radio communications module 205 communicates in accordance with Bluetooth mesh networking. In some other embodiments, radio communications module 205 communicates via one or more other radio telecommunications protocols other than or in addition to Bluetooth mesh networking such as, but not limited to, Z-Wave, ZigBee, Thread, Wi-Fi, straight Bluetooth Low Energy (BLE), classic Bluetooth, and so on.

Receiver 221 is a component that enables luminaire 101-$m$ to telecommunicate with other components and systems by receiving signals that convey information therefrom. It will be clear to those having ordinary skill in the art how to make and use alternative embodiments that comprise more than one receiver 221.

Transmitter 222 is a component that enables luminaire 101-$m$ to telecommunicate with other components and systems by transmitting signals that convey information thereto. For example and without limitation, transmitter 222 is configured to transmit packets comprising the data values mentioned earlier, including the luminaire's source address. It will be clear to those having ordinary skill in the art how to make and use alternative embodiments that comprise more than one transmitter 222.

In accordance with the illustrative embodiment, luminaire 101-$m$ uses radio communications module 205 in order to telecommunicate wirelessly with external devices. It will clear to those skilled in the art, however, after reading the present disclosure, how to make use and use various embodiments of the present invention in which luminaire 101-$m$ communicates via a wired protocol (e.g., X10, KNX, etc.) over physical media (e.g., cable, wire, etc.) with one or more external devices, either in addition to or instead of the wireless capability provided by radio communications module 205.

In generating and transmitting one or more packets that convey a message, along with including its own network address as the source address in the message, luminaire 101-$m$ is said to originate the message. As described below, luminaire 101-$m$ is further capable of forwarding a message that has been originated by a different luminaire.

Figure 3:
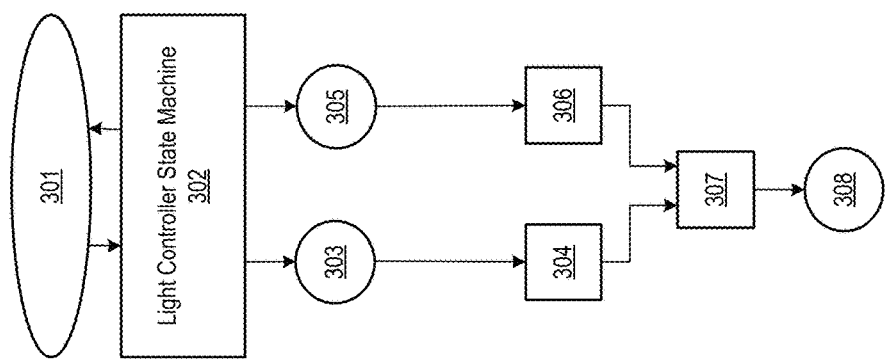
FIG. 3 depicts the salient features of Light Lightness Controller (LC) architecture 300 in the prior art.

FIG. 3 depicts the salient features of Light Lightness Controller (LC) architecture 300 in the prior art. The Light LC is defined in Mesh Model Bluetooth® Specification, Revision v1.0, dated Jul. 13, 2017 (hereinafter, the "Mesh Model"), which is incorporated herein by reference. The Light LC architecture in FIG. 3 is provided in order to distinguish the extended features of the light neighborhood controller architecture 400, depicted in FIG. 4, from those of the Light LC in the Mesh Model.

Inputs 301 are input states to the light LC state machine 302. At least some of the inputs correlate to data (e.g., physical conditions, etc.) reported by one or more sensors. Lightness Out state 303 feeds into Squaring Function 304, and the results of which feed into Function 307, which selects the maximum of its inputs. Lux Level Out state 305 feeds into PI (Proportional-Integral) regulator 306, and the results of which feed into Function 307. The maximum of the inputs into Function 307 is selected as Linear Output 308, which corresponds to output of lamp of luminaire 101-$m$. All of the aforementioned elements are described in the Mesh Model.

Figure 4:
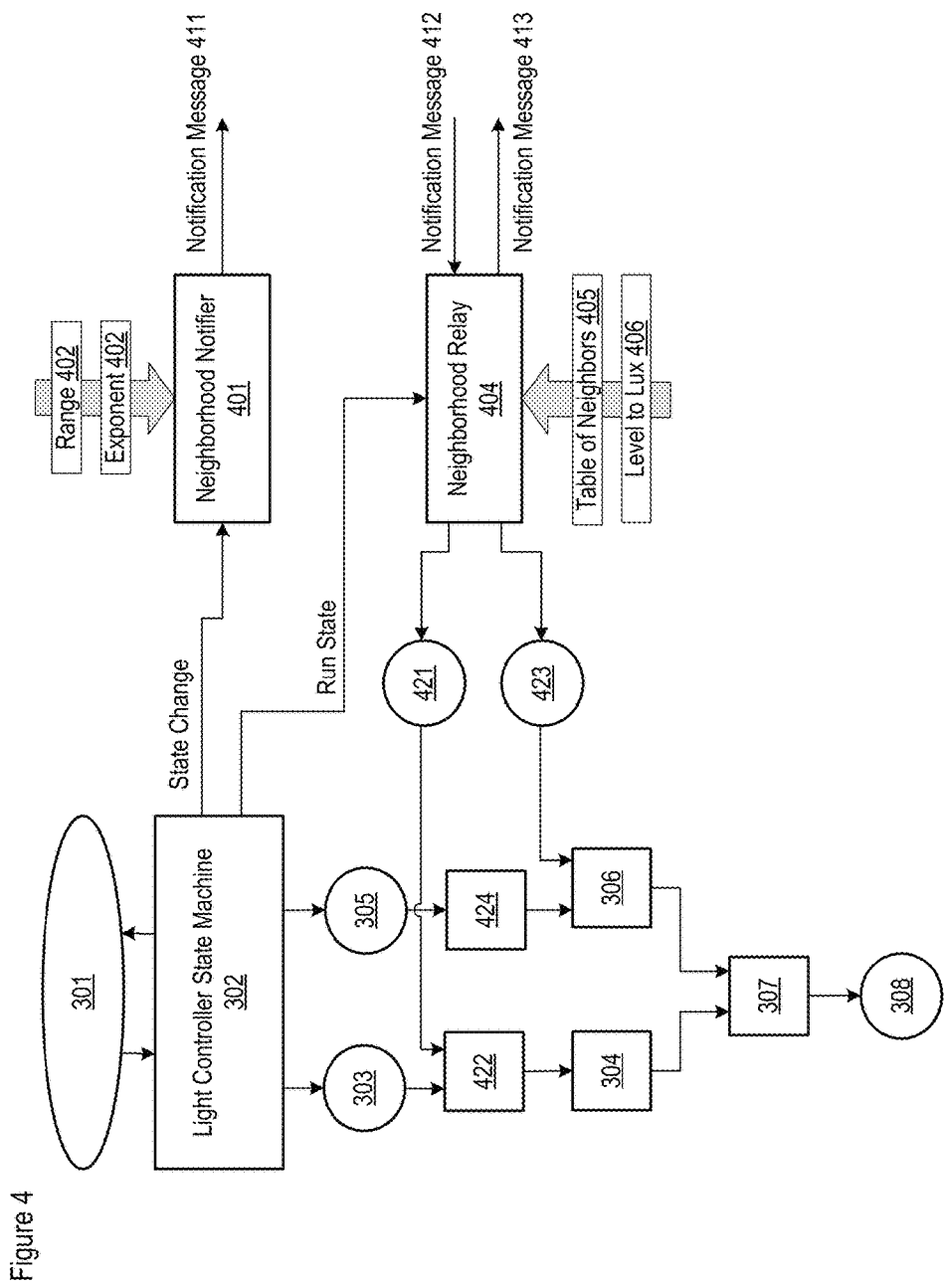
FIG. 4 depicts the salient features of Light Neighborhood Controller (NC) architecture 400, in accordance with the illustrative embodiment.

FIG. 4 depicts the salient features of Light Neighborhood Controller (NC) architecture 400, which extends from architecture 300, in accordance with the illustrative embodiment. In addition to the elements already described above and in regard to FIG. 3, architecture 400 comprises functionality supportive of originating notification messages, receiving notification messages transmitted by other luminaires, and relaying information received in notification messages transmitted by other luminaires.

Architecture 400 includes property states that are read/write states that determine the configuration of a Light NC, which also comprises logic associated with Light Neighborhood Notifier 401 and Light Neighborhood Relay 404. Each state is represented by a device property. The property states include range state 402, decay exponent state 403, table of neighbors 405, and level-to-lux state 406.

Range state 402 is a state that determines the number of logical hops (neighborhood zones) over which a published Light NC notification message is to be retransmitted.

Decay exponent state 403 is a state that determines the exponent in an equation defining the decay of light levels over multiple zones.

Table of neighbors 405 is a data structure (e.g., an array, etc.) of unicast addresses of luminaire nodes that are logical neighbors.

Level-to-lux state 406 is a state that determines the light level (in lux) that lamp 202-1 of luminaire 101-$m$ provides at its maximum level. In some embodiments, this state is applicable to lighting systems having ambient light sensors (ALS), wherein the controller directs the ALS-equipped luminaire to provide an absolute lightness that is specified in lux.

Architecture 400 also depicts notification messages 411, 412, and 413. Each notification message is used to notify neighborhood luminaires about a change of state of a Light LC in the neighborhood. In some embodiments of the present invention, each notification message is unacknowledged.

For example, luminaire 101-5 can originate and transmit notification message 411 if its neighborhood controller notifier 401 detects a state change in state machine 302. These actions are described in detail below and in regard to FIG. 5.

As another example, luminaire 101-1 can receive notification message 412 that was originated or relayed by another luminaire (e.g. luminaire 101-5, luminaire 101-2, etc.). Luminaire 101-1 can then take action on the received notification message. For example, the luminaire's relay 404 logic can output an updated Lightness NC Out value 421 that can than be compared with pre-existing Lightness level value 303; depending on how the two output values compare with each other, one of the values (e.g., the maximum, etc.) can then be used to adjust the light output of the luminaire's lamp. Similarly, the luminaire's relay 404 logic can output an updated LuxLevel NC Out value 423 that can than be compared with pre-existing Lux Level Out value 305; depending on how the two output values compare with each other, one of the values (e.g., the maximum, etc.) can then be used to adjust the light output of the luminaire's lamp. These actions are described in detail below and in regard to FIG. 6.

Luminaire 101-1 can also retransmit a received notification via notification message 413, which is also described in detail below and in regard to FIG. 6.

Figure 5:
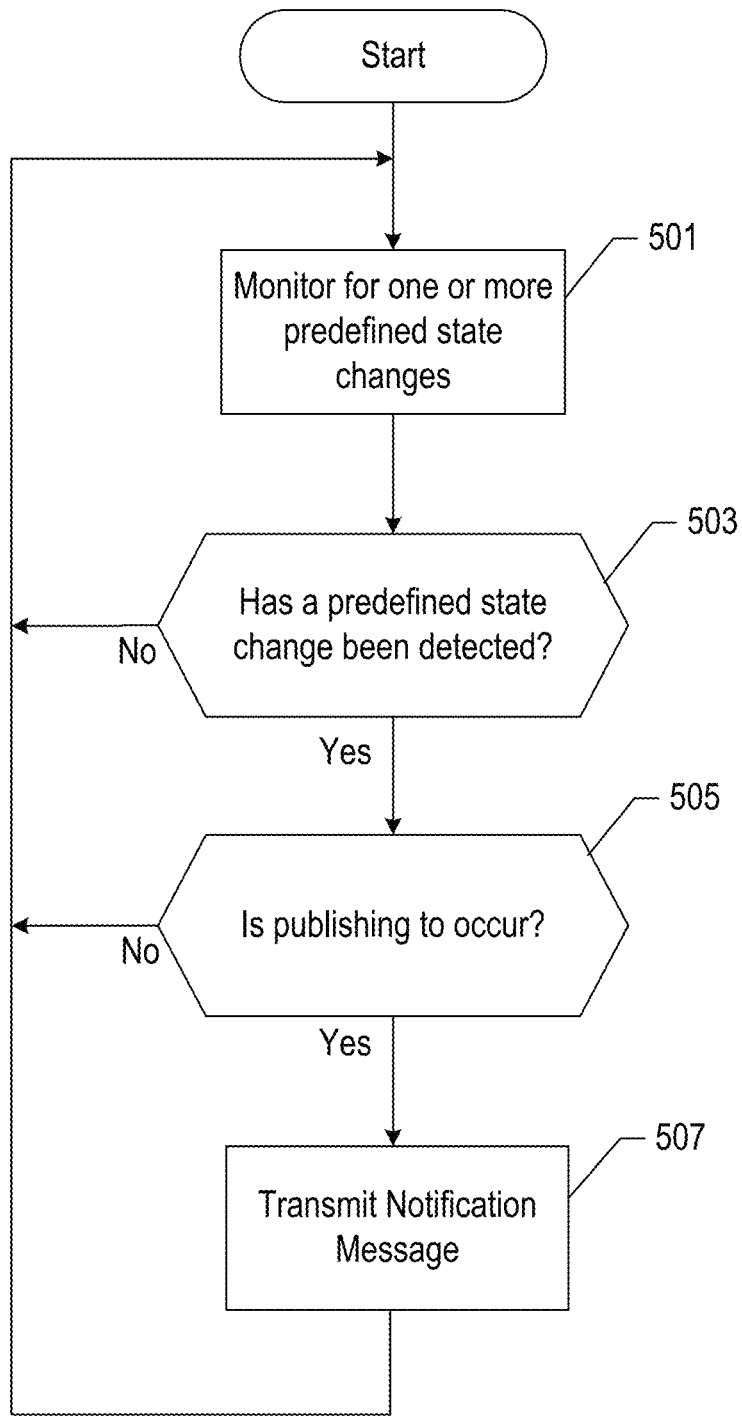
FIG. 5 depicts salient operations of method 500 according to the illustrative embodiment, by which each luminaire 101-*m* performs various functions related to originating and transmitting one or more notification messages 411.

Operations of Luminaire 101-m in Originating a Notification Message:

FIG. 5 depicts salient operations of method 500 according to the illustrative embodiment, by which each luminaire 101-m performs various functions related to originating and transmitting one or more notification messages 411.

In regard to method 500, as well as to the other methods depicted in the flowcharts and message flow diagrams contained herein, it will be clear to those having ordinary skill in the art, after reading the present disclosure, how to make and use alternative embodiments of the disclosed methods in which the recited operations, sub-operations, and messages are differently sequenced, grouped, or sub-divided—all within the scope of the present invention. It will be further clear to those skilled in the art, after reading the present disclosure, how to make and use alternative embodiments of the disclosed methods wherein some of the described operations, sub-operations, and messages are optional, are omitted, or are performed by other elements and/or systems than luminaire 101-m.

Luminaire 101-5 is featured here for pedagogical purposes as performing the operations associated with method 500. As those who are skilled in the art will appreciate after reading this specification, other luminaires are capable of performing method 500 concurrently with luminaire 101-5 and with one another.

In accordance with operation 501, luminaire 101-5 monitors its Light LC state machine 302 for one or more predefined changes in state. This corresponds to the "State Change" information in FIG. 4 being provided from state machine 302 to neighborhood notifier process 401. In particular, luminaire 101-5 monitors for the following state changes as defined in the Mesh Model cited above: "Change from Standby to Fade On", "Change from Run to Fade", "Change from any state to Fade Standby Auto", or "Change from any state to Fade Standby Manual".

At least some of these states changes correlate to a change in a physical condition being monitored by sensor unit 201-j, as described above and in regard to FIG. 2. For example, Change from Standby to Fade On can be associated with a detection of something by a sensor (e.g., occupancy, etc.) or manual actuation of a (wall) switch.

In accordance with operation 503, only if a predefined state change is detected does control of task execution proceed to operation 505.

Luminaire 101-5 determines at operation 505 whether publishing is to occur. In some embodiments of the present invention, range state 402 having a value greater than zero is used to indicate that publishing is to occur.

If publishing is to occur, luminaire 101-5 at operation 507 transmits notification message 411. Message 411 comprises a plurality of fields that represent the following:

i. a source address, whose field is set to the network address of luminaire 101-5 (i.e., as the originating node). The network address of luminaire 101-5 is unique within the mesh network depicted in FIG. 1; each luminaire with the mesh network has its own unique address with the illustrative network.

ii. a propagation range, whose field is set to the value of range state 402.

iii. a hop count, whose field is set to one.

iv. a light level. If the light level is representative of a relative value of lightness (i.e., light amount), the field is set to the value of lightness out state 303. If the light level is representative of a level of lux, the field is set to the value of lux level out state 305. As those who are skilled in the art will appreciate after reading this specification, both types of light levels can be transmitted in any of the notification messages, including message 411.

v. a fade time that defines a transition time, whose field is set to the value of a predefined time interval.

vi. an exponent for defining the decay of light levels, and whose field is set to the value of decay exponent state 403. As those who are skilled in the art will appreciate after reading this specification, a different type of decay quantity can be represented in this field for the purpose of defining the decay of light level other than exponentially (e.g., linearly, etc.).

In some embodiments of the present invention, luminaire 101-5 also uses a transaction identification (TID) field in message 411, in well-known fashion.

In accordance with the illustrative embodiment, luminaire 101-5 transmits notification message 411 without including a destination address. Accordingly, it is up the other luminaires in the data network to determine whether to act on message 411, if received, based on the source address that is present in the message, and not based on any destination address.

After operation 507, control of task execution proceeds back to operation 501.

Figure 6:
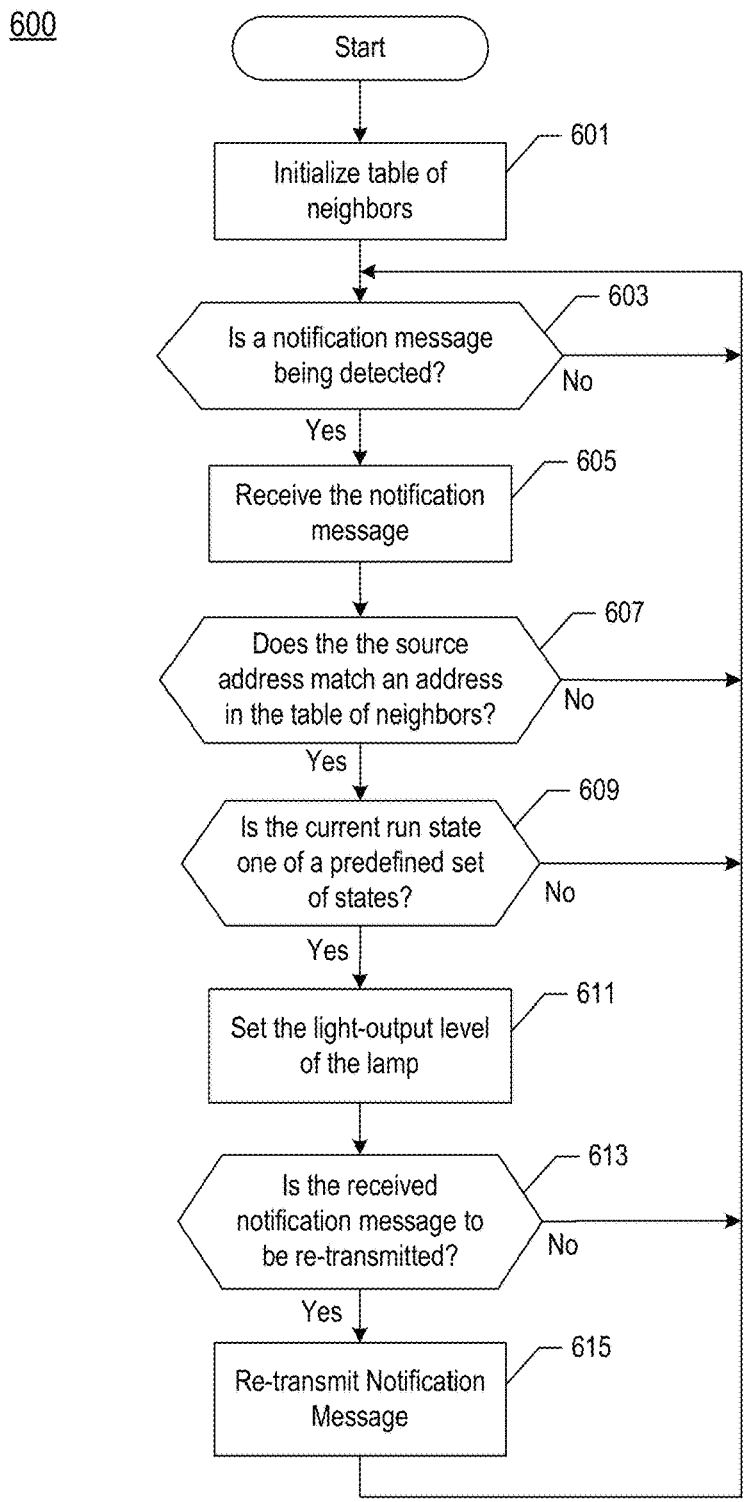
FIG. 6 depicts salient operations of method 600 according to the illustrative embodiment, by which each luminaire 101-*m* performs various functions related to receiving one or more notification messages 412 and relaying one or more notification messages 413.

Operations of Luminaire 101-m in Receiving and Relaying a Notification Message:

FIG. 6 depicts salient operations of method 600 according to the illustrative embodiment, by which each luminaire 101-m performs various functions related to receiving one or more notification messages 412 and relaying one or more notification messages 413.

Luminaire 101-1 is featured here for pedagogical purposes as performing the operations associated with method 600. As those who are skilled in the art will appreciate after reading this specification, other luminaires are capable of performing method 600 concurrently with luminaire 101-1 and with one another. In addition, a given luminaire is capable of performing both methods 500 and 600.

In accordance with operation 601, luminaire 101-1 initializes its neighbor database, based on table of neighbors 405. In some embodiments of the present invention, the neighbor database is configured manually, while in some other embodiments the neighbor database is populated automatically—for example, by receiving table of neighbors 405 from a different node, discovering the neighbors based on radio transmissions (e.g., signal strength, time of flight, angle of arrival, etc.), and so on.

In accordance with operation 603, luminaire 101-1 monitors for notification messages transmitted by other luminaires. If a notification message is detected, luminaire 101-1 at operation 605 receives and reads in notification message 412. Message 412 can be a message that was originated by a different luminaire, such as luminaire 101-5 having originated message 411, or can be a message that was relayed (retransmitted) by a different luminaire, such as luminaire 101-2, for example, having relayed message 413.

In accordance with operation 607, if the source address in message 412 matches a neighbor address in the database initialized at operation 601, control of task execution proceeds to operation 609; otherwise, control proceeds back to operation 603.

In accordance with operation 609, luminaire 101-1 monitors its Light LC state machine 302 for one or more predefined states. This corresponds to the "Run State" information in FIG. 4 being provided from state machine 302 to neighborhood relay process 404. In particular, the predetermined set of states includes the following that are defined in the Mesh Model: Standby, Fade, Prolong, Fade Standby Auto, and Fade Standby Manual. If the Light LC Controller is in one of the predefined set of states, control of task execution proceeds to operation 611; otherwise, control proceeds back to operation 603.

In accordance with operation 611, neighborhood controller relay 404 of luminaire 101-1 sets Lightness NC Out state 421, Lux Level NC Out state 423, and the transition time, as described below and in FIG. 7.

In accordance with operation 613, luminaire 101-1 determines whether information in the received notification message 412 is to be retransmitted. If the value in the hop count field is less than the range field received in message 413, control of task execution proceeds to operation 615; otherwise, control proceeds back to operation 603. In some embodiments of the present invention, luminaire 101-1 also uses a transaction identification (TID) field and TID cache in well-known fashion, in order to determine whether to proceed to operation 615 or not.

In accordance with operation 615, luminaire 101-1 relays notification message 413. Message 413 comprises a plurality of fields that represent the following:
  i. a source address, whose field is set the source address of luminaire 101-5 (i.e., as the originating node, as opposed to luminaire 101-1 serving as a relay node).
  ii. a propagation range, whose field is set to the value of the corresponding field in received message 412.
  iii. a hop count, whose field is set to the value of the corresponding field in received message 412, incremented by one.
  iv. a light level, whose field or fields are set to the value of the corresponding fields (Lightness, LuxLevel) in received message 412.
  v. a fade time, whose field is set to the value of the corresponding field in received message 412.
  vi. a decay exponent, whose field is set to the value of the corresponding field in received message 412. As explained earlier, a different type of decay quantity can be represented in this field for the purpose of defining the decay of light level other than exponentially (e.g., linearly, etc.).

In those embodiments of the present invention in which luminaire 101-1 uses a transaction identification (TID) field and TID cache, the luminaire also sets the TID field in message 413 and stores the value of the TID field in the TID cache.

After operation 615, control of task execution proceeds back to operation 603.

Figure 7:
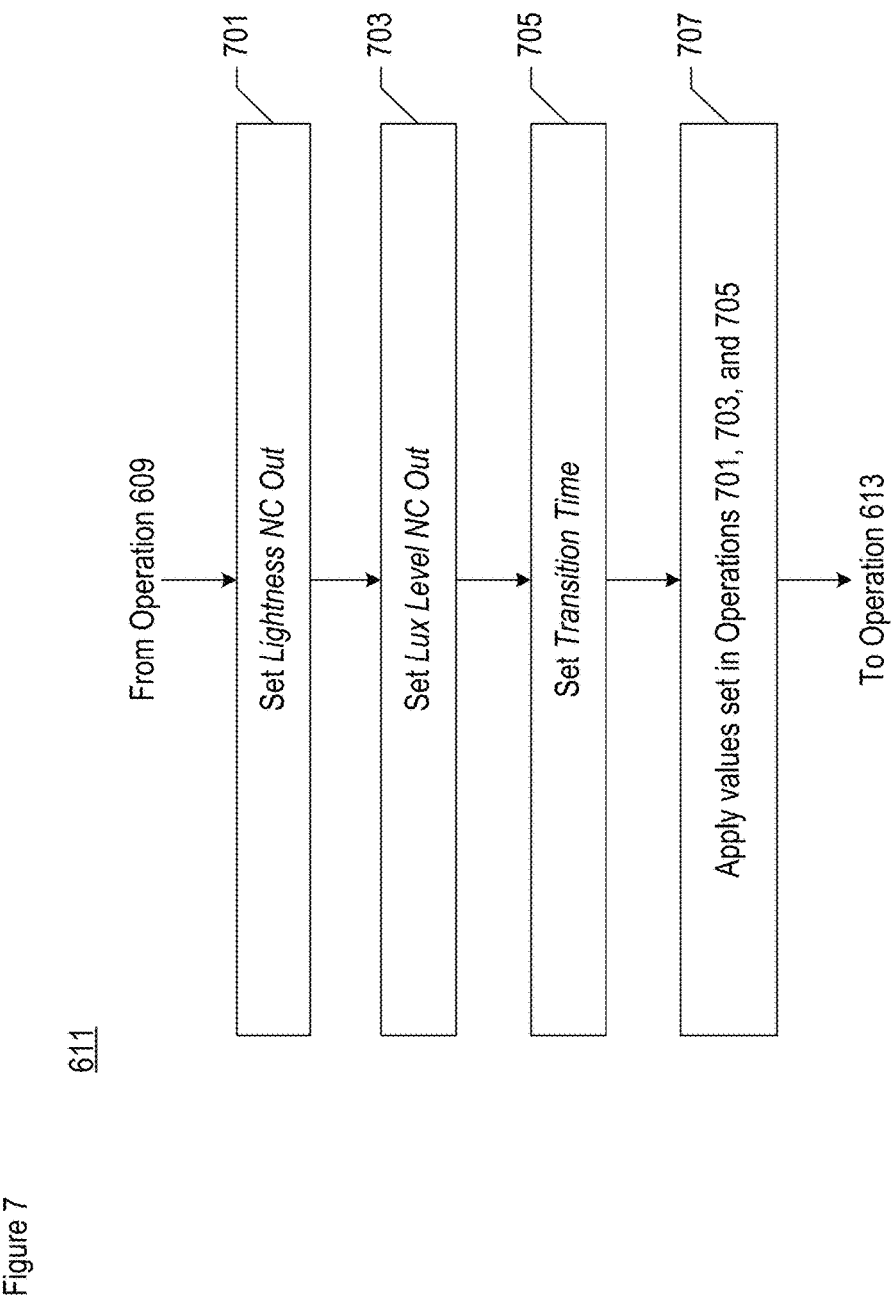
FIG. 7 depicts salient sub-operations of operation 611, by which a luminaire performs various functions related to modifying the light output of its lamp.

Operations of Luminaire 101-m in Controlling its Lamp:

FIG. 7 depicts salient sub-operations of operation 611, by which a luminaire performs various functions related to modifying the output of its lamp.

In accordance with operation 701, neighborhood controller relay 404 of luminaire 101-1 sets Lightness NC Out state 421, to the value that is determined using Equation 1:

$$\text{Lightness } NC \text{ Out} = \text{Lightness} * \left(1 - \frac{HopCt}{\text{Range}}\right)^{DecayExp}, \quad \text{(Eq. 1)}$$

wherein:
  Lightness is the value of the lightness field (light level field if representing lightness) of received notification message 412,
  HopCt is the value of the hop count field of message 412,
  Range is the value of the range field of message 412, and
  DecayExp is the value of the decay exponent field of message 412.

In accordance with operation 703, neighborhood controller relay 404 of luminaire 101-1 sets LuxLevel NC Out state 423, to the value that is determined using Equation 2:

$$\text{LuxLevel } NC \text{ Out} = \text{LuxLevel} * \left(1 - \frac{HopCt}{\text{Range}}\right)^{DecayExp}, \quad \text{(Eq. 2)}$$

wherein:
  LuxLevel is the value of the luxlevel field (light level field if representing lux level) of received notification message 412,
  HopCt is the value of the hop count field of message 412,
  Range is the value of the range field of message 412, and
  DecayExp is the value of the decay exponent field of message 412.

As those who are skilled in the art will appreciate after reading this specification, a different decay quantity can be used to determine the decay of light level other than exponentially (e.g., linearly, etc.), and for one or both of Lightness NC Out state 421 and LuxLevel NC Out state 423.

In accordance with operation 705, neighborhood controller relay 404 of luminaire 101-1 sets the transition time to the value represented by the fade time field of received notification message 412.

In accordance with operation 707, luminaire 101-1 applies the values of Lightness NC Out state 421, LuxLevel NC Out state 423, and/or the transition time, as determined in operations 701, 703, and 705, respectively. In doing so, controller 203 of luminaire 101-1 determines light output 308 and transmits control signals to its lamp 202-1 accordingly, while accounting for the transition time. The controller of luminaire 101-1 determines light output 308 based on the relationship of states 421 and 423 to light output 308 described above and with respect to FIG. 4.

When luminaire 101-1 receives notification messages from multiple luminaires, its controller tracks each individual neighbor (i.e., each luminaire that is in stored table of neighbors 405) and selects the maximum value of all tracked neighbors. For example, luminaire 101-1 is at a 10% lightness level. It receives a first notification message from neighbor luminaire 101-5 conveying a lightness value of 40%, thereby triggering luminaire 101-1 to output at 40%. It also receives a second notification message from neighbor luminaire 101-2 conveying a lightness value of 70%, thereby triggering luminaire 101-1 to output at 70% (i.e., the maximum value of 10, 40, and 70 percent). After luminaire 101-2 becomes inactive (while luminaire 101-5 remains active), luminaire 101-1 falls back to 40% because it is the maximum value of 10% and 40%.

As those who are skilled in the art will appreciate after reading this specification, a different comparing function than "maximum" can be used to determine a light output (e.g., minimum, average, median, etc.).

It is to be understood that the disclosure teaches just one example of the illustrative embodiment and that many variations of the invention can easily be devised by those skilled in the art after reading this disclosure and that the scope of the present invention is to be determined by the following claims.

What is claimed is:

1. A system comprising a data network of luminaires including a first luminaire, the first luminaire comprising:
    a first receiver configured to receive wirelessly a first message from a second luminaire, wherein the first message comprises a first source address, a first propagation range, a first hop count, and a first light level;
    a first lamp configured to provide light at a first light output;
    a first controller configured to modify the first light output based on:
        i) the first light level,
        ii) the first hop count,
        iii) the first propagation range, and
        iv) whether or not the first source address is a member of a first non-empty set of neighbor addresses; and
    a first transmitter configured to transmit wirelessly a second message, wherein the first transmitter of the first luminaire decides whether or not to transmit the second message based on i) the first hop count and ii) the first propagation range.

2. The system of claim 1 further comprising the second luminaire, the second luminaire comprising:
    a sensor configured to monitor a physical condition;
    a second receiver configured to receive wirelessly a third message from a third luminaire in the data network, wherein the third message comprises a second propagation range, a second hop count, and a second light level;
    a second lamp configured to provide light at a second light output;
    a second controller configured to i) monitor for a predefined state change that is based on a change in the physical condition and ii) modify the second light output based on:
        a) the second light level,
        b) the second hop count, and
        c) the second propagation range;
    a second transmitter configured to transmit wirelessly a fourth message based on the predetermined state change, and wherein the fourth message comprises a source address field that is populated with the network address of the second luminaire in the data network of luminaires.

3. The system of claim 2 wherein the second controller of the second luminaire determines the second light output further based on the predetermined state change.

4. The system of either of claim 1 wherein the sensor comprises a switch and the predetermined state change corresponds to one of i) the switch being turned on and ii) the switch being turned off.

5. The system of claim 1 wherein the first message further comprises an exponent for characterizing the decay of the first light level, and wherein the first controller determines the first light output further based on the exponent received in the first message.

6. The system of claim 1 wherein the first light level received in the first message is representative of a relative value of light amount.

7. The system of claim 1 wherein the first light level received in the first message is representative of a level of lux.

8. The system of claim 1 wherein the first message further comprises a fade time that characterizes a transition time from a second light level to a third light level, and wherein the first controller of the first luminaire determines the first light output further based on the fade time received in the first message.

9. The system of claim 1:
    wherein the first receiver of the first luminaire is further configured to receive wirelessly a third message from a third luminaire, wherein the third message comprises a third source address, a third propagation range, a third hop count, and a third light level;
    wherein the first controller of the first luminaire is configured to modify the first light output of the first lamp, further based on
        i) the third light level,
        ii) the third hop count,
        iii) the third propagation range, and
        iv) whether or not the third source address is a member of a second non-empty set of neighbor addresses; and
    wherein the first transmitter of the first luminaire is configured to transmit wirelessly a fourth message, wherein the transmitter of the first luminaire decides whether or not to transmit the fourth message based on i) the third hop count and ii) the third propagation range received in the third message.

10. The system of claim 1 wherein the first luminaire communicates with other luminaires in the data network of luminaires in accordance with Bluetooth mesh networking.

11. A method for controlling a plurality of luminaires in a data network that comprises a first luminaire and a second luminaire, the method comprising:
    receiving wirelessly, by the first luminaire, a first message from the second luminaire, wherein the first message comprises a first source address, a first propagation range, a first hop count, and a first light level;
    modifying, by the first luminaire, a first light output of a first lamp included in the first luminaire, wherein the first light output is based on:
        i) the first light level,
        ii) the first hop count, and
        iii) the first propagation range that are received in the first message, and
        iv) whether or not the first source address is a member of a first non-empty set of neighbor addresses; and
    transmitting wirelessly a second message, by the first luminaire, wherein the first luminaire decides whether or not to transmit the second message based on i) the first hop count and ii) the first propagation range; and
    providing light, by the first lamp, at the first light output.

12. The method of claim 11 further comprising:
    monitoring, by a sensor of the second luminaire, a physical condition;
    receiving wirelessly, by the second luminaire, a third message from a third luminaire in the data network, wherein the third message comprises a second propagation range, a second hop count, and a second light level;

monitoring, by the second luminaire, for a predefined state change that is based on a change in the physical condition;

modifying, by the second luminaire, a second light output of a second lamp, wherein the second light output is based on
  a) the second light level,
  b) the second hop count, and
  c) the second propagation range that are received in the third message;

transmitting wirelessly, by the second luminaire, a fourth message based on the state change, wherein the fourth message comprises a source address filed that is populated with the network address of the second luminaire in the data network of luminaires; and providing light, by the second lamp, at the second light output.

13. The method of claim 12 wherein the second light output is further based on the predetermined state change.

14. The method of either of claim 12 wherein the sensor comprises a switch and the predetermined state change corresponds to one of i) the switch being turned on and ii) the switch being turned off.

15. The method of claim 11 wherein the first message further comprises an exponent for characterizing the decay of a first light level, and wherein first light output is further based on the exponent received in the first message.

16. The method of claim 11 wherein the first light level received in the first message is representative of a relative value of light amount.

17. The method of claim 11 wherein the first light level received in the first message is representative of a level of lux.

18. The method of claim 11 wherein the first message further comprises a fade time that characterizes a transition time from a second light level to a third light level, and wherein the first light output is further based on the fade time received in the first message.

19. The method of claim 11, further comprising:

receiving wirelessly, by the first receiver of the first luminaire, a third message from a third luminaire, wherein the third message comprises a second source address, a second propagation range, a second hop count, and a second light level;

modifying, by the first controller of the first luminaire, the first light output of the first lamp, further based on
  i) the light level,
  ii) the hop count,
  iii) the range that are received in the third message, and
  iv) whether or not the third source address is a member of a second non-empty set of neighbor addresses; and transmitting wirelessly a fourth message, by the first transmitter of the first luminaire, wherein the transmitter of the first luminaire decides whether or not to transmit the fourth message based on i) the third hop count and ii) the third propagation range received in the third message.

20. The method of claim 11 wherein the first luminaire communicates with other luminaires in the data network of luminaires in accordance with Bluetooth mesh networking.

* * * * *